United States Patent Office 3,715,223
Patented Feb. 6, 1973

3,715,223
PRODUCTION OF BASIC REFRACTORIES
Edmund S. Wright, Clearfield, Pa., assignor to
Eltra Corporation, Toledo, Ohio
No Drawing. Filed Mar. 12, 1971, Ser. No. 123,814
Int. Cl. C04b 35/42
U.S. Cl. 106—59
4 Claims

ABSTRACT OF THE DISCLOSURE

The production of magnesite chrome and chrome magnesite refractories is disclosed. The principal batch ingredients are from 40 to 80 parts by weight of dead burned magnesite or synthetic periclase and from 60 to 20 parts by weight of chrome ore. The magnesite or periclase and the chrome ore are suitably sized, mixed with minor batch ingredients, e.g. lime hydrate and lignin sulfate as a temporary binder, and tempered. The desired shape is then pressed from the tempered batch, and the shape is fired, e.g. to a temperature of 2500° F. or higher. Calcium nitrate is dissolved in the tempering liquid, prior to pressing of the desired shape; as a consequence of the calcium nitrate dissolved in the tempering liquid it has been found that the porosity of the final refractory is substantially reduced and as a consequence, it is believed, of the reduction in porosity, the final refractory has outstanding slag-resistance.

BACKGROUND OF THE INVENTION

Magnesite chrome and chrome magnesite refractories have long been known. The early refractories of these types were sold in either the chemically bonded state or in the ceramically bonded state. Chemical bonding can be achieved by adding magnesium sulfate to the brick batch, usually dissolved in a tempering liquid, pressing a shape from the batch and then drying the shape at a comparatively low temperature, e.g. in the vicinity of 300 to 400° F. During drying, a magnesium oxy-sulfate "chemical" bond is formed, and gives the refractory shape sufficient strength that it can be handled, and even shipped and installed in a furnace, steel converter, or the like. If a chemically bonded refractory of the type in question is so installed, a ceramic bond is formed under service conditions. Alternatively, such a brick can be fired by the refractory manufacturer, e.g., at a temperature in the range of 2200 to 2800° F. to produce what has been called a "silicate" bonded magnesite chrome or chrome magnesite refractory. The term "silicate" bonding refers to an accessory silicate phase which is present in most refractories of the type in question; when the principal mechanism by which the constituents of such refractories are bonded to one another is by attachment of bodies of this accessory phase to adjacent particles, whether both are magnesite, both are chromite, or one is chromite and one is magnesite, the refractory is said to be "silicate" bonded.

So-called "direct bonded" magnesite chrome and chrome magnesite refractories were announced[1] in the 1950's. Apparently, it is possible for adjacent magnesite particles to bond to one another and to adjacent chromite particles by solid state diffusion, by the action of minute particles that crystallize from the silicate accessory phase during the cooling portion of the burning operation, or both. Similar bonding is also possible between adjacent chromite particles. These types of bonding are sometimes called "direct." So-called "direct" bonding is achieved by using comparatively high firing temperatures, e.g. 2900° F. or higher, and is favored if the chrome ore is finer than the —4 +28 mesh material that had customarily been used in producing "silicate bonded" refractories of the type in question. Silica content of the chrome ore is also characteristically lower when "direct bonded" refractories are being produced than when "silicate bonded" products are desired.

SUMMARY OF THE INVENTION

According to the instant invention, a magnesite chrome or chrome magnesite refractory is produced by a method which includes the step of tempering an appropriate batch with a liquid, usually water, containing dissolved calcium nitrate. The tempering step is carried out before the batch is pressed into a desired shape. The benefit achieved according to the invention can be detected in the unfired shape, and is manifested by a substantial increase in the density thereof. The benefit is also manifested in the fired shape, and is measured with the greatest reliability by determining the total porosity[2] thereof. It will be appreciated, therefore, that the method of the instant invention can be used to produce improved chemically bonded, silicate bonded and direct bonded magnesite chrome and chrome magnesite refractories. It is particularly advantageous, however, in the production of direct bonded refractories of the indicated type.

OBJECTS

It is, therefore, an object of the invention to provide an improved method for producing magnesite chrome and chrome magnesite refractories.

Other objects and advantages will be apparent from the description which follows and, in particular, from the examples. Example 1 is the best presently known mode for practicing the invention.

EXAMPLE 1

Magnesite chrome refractories were produced from a batch consisting of 34 parts[3] of —6 +14 mesh[4] magnesite, 26 parts of —150 mesh dead burned magnesite, and 40 parts of chrome ore. The batch ingredients were dry mulled with 1½ parts of lignin sulfate to produce a substantially uniform mixture, and this mixture was then temperated with 3.6 parts of a 50 percent aqueous solution of calcium nitrate. The tempered batch was then dry pressed into bricks, under a total pressure of about 14,000 pounds per square inch. The bricks were dried at a temperature of about 425° F. and were stacked on kiln cars and fired at a temperature of about 3100° F. in a periodic kiln. The total time at temperature was approximately ten hours. The average porosity of the bricks was found to be 13.45 percent by volume. The modulus of rupture was found to be 1676 pounds per sqare inch at 2350° F. and 366 pounds per square inch at 2700° F. Brick produced as described in Example 1 have been found to have excellent resistance to spalling and to erosion by liquid slags.

For purposes of comparison, but not in accordance with the invention, brick were also produced as described in Example I, except that 0.76 part by weight of hydrated lime was mixed with the dry batch ingredients and these ingredients were tempered with 3.2 parts of a solution containing 22 percent of magnesium sulfate; these brick had a modulus of rupture at 2350° F. of 1346

---

[1] See, for example, Richardson et al., Trans. Br. Ceram. Soc. 59, pp. 483 et seq. (1960); Frenkel et al., Ogneupory, No. 8, p. 337 (1956); Panarin, Ogneupory, 23, pp. 481 and following (1958); Panarin, Ogneupory, p. 418 (1961); and Hubble and Powers, Ceramic Bulletin, 42, No. 7 (1963).

[2] The term "porosity" as used herein, refers to open porosity, as indicated by the ability of the refractory in question to absorb water.
[3] The terms "parts" and "percent" are used herein, and in the appended claims, to refer to parts and percent by weight, unless otherwise indicated.
[4] All mesh sizes reported herein refer to the Tyler Sieve Series.

pounds per square inch and a total porosity of 14.7 percent by volume. Of the two samples on which a determination of modulus of rupture at 2700° F. was made, one gave a modulus of 299 pounds per square inch and the other gave a modulus of 50 pounds per square inch, but the latter broke off center, probably indicating a defect in the brick.

The dead burned magnesite used in making brick as described in Example 1 was produced by burning natural magnesite of Euboean origin in a rotary kiln. A typical analysis, on an ignited basis, is 95.24 percent of MgO, 2.72 percent of calcium oxide, 1.46 percent of silica, 0.01 percent of $Cr_2O_3$, 0.53 percent of iron oxide ($Fe_2O_3$), 0.03 percent of aluminum oxide, and 0.012 percent of $B_2O_3$.

The chrome ore used in preparing brick as described in Example 1 was beneficiated Transvaal ore. Typical analysis, on an ignited basis, and sizing, presented as cumulative percent retained on various mesh screens, are set forth in the following tables:

| | |
|---|---:|
| $SiO_2$ | 0.62 |
| $Cr_2O_3$ | 45.07 |
| CaO | 0.04 |
| MgO | 9.74 |
| $Fe_2O_3$ | 29.08 |
| $Al_2O_3$ | 15.45 |

| Cumulative percent retained: | Mesh |
|---|---:|
| 4 | 14 |
| 14 | 20 |
| 31 | 28 |
| 48 | 35 |
| 67 | 48 |
| 81 | 65 |
| 90 | 100 |
| 95 | 150 |
| 98 | 200 |

EXAMPLES 2 THROUGH 8

The procedure described in Example 1 was also used to produce a series of bricks differing from one another principally with respect to the lime to silica weight ratio therein and, to a minor extent, relative to the total chemistry. In some cases, the concentration of calcium nitrate in the solution used to temper the dry batch was varied and, in others, additional lime, added as lime hydrate, was mixed with the dry blend, and a calcium nitrate solution was used to temper the batch. The various batches are identified in the following table:
the batch. The various batches are identified in the following table:

| | Percent of calcium nitrate in tempering liquid | Parts of— | | Calculated lime to silica weight ratio |
|---|---|---|---|---|
| | | Tempering liquid | Calcium hydrate added to the dry batch | |
| Example: | | | | |
| 2 | 30 | 2.7 | None | 1.73 |
| 3 | 40 | 3.1 | None | 1.86 |
| 4 | 45 | 3.1 | None | 1.90 |
| 5 | 40 | 3.4 | 2.0 | 3.25 |
| 6 | 50 | 3.6 | 0.1 | 2.09 |
| 7 | 40 | 3.1 | 0.4 | 2.12 |
| 8 | 40 | 3.2 | 1.2 | 2.68 |

The modulus of rupture of the bricks of Examples 2 through 8 at 2350° F. and 2700° F. and the porosity of each are presented in the following table:

| | Modulus of rupture, lbs. per square inch (average of two) | | Porosity, volume percent |
|---|---|---|---|
| | 2,350° F. | 2,700° F. | |
| Example: | | | |
| 2 | 2,200 | 311 | 12.48 |
| 3 | 1,864 | 376 | 12.56 |
| 4 | 1,909 | 368 | 13.37 |
| 5 | 739 | 230 | 16.11 |
| 6 | 2,295 | 310 | 13.23 |
| 7 | 1,602 | 343 | 13.83 |
| 8 | 967 | 286 | 15.82 |

The procedures of Examples 1 through 8 were also repeated, except that the pressed shapes were fired in a tunnel kiln at approximately 3225° F., approximately eight hours at temperature, instead of in a periodic kiln. Modulus of rupture at 2350° F. and at 2700° F. and porosity for these brick are set forth in the following table:

| | Modulus of rupture, lbs. per square inch (average of two) | | Porosity, volume percent |
|---|---|---|---|
| | 2,350° F. | 2,700° F. | |
| Example: | | | |
| 1 | 2,007 | 611 | 13.90 |
| 2 | 2,209 | 540 | 12.42 |
| 3 | 2,080 | 496 | 12.65 |
| 4 | 2,219 | 629 | 13.89 |
| 5 | 1,561 | 357 | 20.67 |
| 6 | 2,256 | 663 | 13.08 |
| 7 | 2,217 | 658 | 14.32 |
| 8 | 1,670 | 455 | 19.84 |

For purposes of comparison, but not in accordance with the invention, the procedure described above in Example 1 was repeated, except that 0.76 part of hydrated lime was added to the dry mix of dead burned magnesite, chrome ore and lignin sulfate, and the dry mix was tempered with 3.2 parts of a 22 percent water solution of magnesium sulfate instead of with 3.3 parts of a 50 percent aqueous solution of calcium nitrate, and firing was in a tunnel kiln to approximately 3225° F., eight hours at temperature. The brick produced by this comparative procedure had a modulus of rupture at 2350° F. of 1094 pounds per square inch, a modulus of rupture at 2700° F. of 395 pounds per square inch, and a porosity of 17.9 percent. The green refractory had a density of 209.7 pounds per cubic foot, as pressed, and a density of 205.2 pounds per cubic foot, after drying. The brick, after firing, had a density of 3.15 grams per cubic centimeter.

The green, or as pressed, and dried densities, in pounds per cubic foot, and the as fired densities of the refractories of Examples 1 through 8 are set forth in the following table:

| | Green density, pounds per cubic foot | Dried density, pounds per cubic foot | Fired density | |
|---|---|---|---|---|
| | | | Tunnel kiln, grams per cubic centimeter | Periodic kiln, grams per cubic centimeter |
| Example: | | | | |
| 1 | 214.2 | 210.8 | 3.31 | 3.32 |
| 2 | 210.5 | 207.0 | 3.35 | 3.34 |
| 3 | 213.5 | 210.1 | 3.35 | 3.36 |
| 4 | 214.1 | 210.8 | 3.31 | 3.32 |
| 5 | 210.4 | 207.0 | 3.03 | 3.21 |
| 6 | 214.1 | 210.6 | 3.35 | 3.32 |
| 7 | 212.3 | 208.9 | 3.29 | 3.30 |
| 8 | 211.4 | 207.5 | 3.09 | 3.23 |

EXAMPLES 9 THROUGH 18

The procedure of Example 1 was also used to produce another series of bricks differing from one another principally in total silica content and, in some cases, with respect to weight ratio of lime to silica. All batches were tempered with 3.4 parts of a 50 percent aqueous solution of calcium nitrate, or with 3.4 parts of the calcium nitrate solution plus water as required to achieve a pressable batch consistency. Varying amounts of fumed silica were added to the batches of Examples 10 through 16 while a chrome ore having a higher silica content was used in the batches of Examples 17 and 18. Hydrated lime was added to the batches of Examples 10 through 18 to control the weight ratio of lime to silica. For each batch, the total silica content, the lime to silica weight ratio, the burned density, the moduli of rupture at room temperature and at 2700° F. and the porosity are set forth in the following table:

raw material control, by adding free silica as fumed or other silica to the batch, or by using a blend of the chrome ore identified above and a second chrome ore having an appropriately higher silica content. The overall lime:silica weight ratio can also be controlled by the expedients disclosed in Examples 2 through 9, supra, or by those suggested in British Pat. 1,098,162 (1968). It is usually preferred that the overall weight ratio of lime to silica be from about 1.5:1 to about 2.5:1.

In general, in producing a refractory according to the method of the invention, the total silica content thereof can be as high as about 2.5 percent, although there appears to be no particular advantage in having more than about 2 percent of silica. Excellent results have been achieved where the silica content ranged from about 1 percent to 2 percent, and optimum results, with the magnesite disclosed above, where silica ranged from about 1.1 percent to about 1.2 percent.

| Example: | Total $SiO_2$, percent | Lime to silica weight ratio | Fired density, grams per cubic centimeter | Modulus of rupture, lbs. per square inch | | Porosity, volume percent |
|---|---|---|---|---|---|---|
| | | | | Room temp. | 2,700° F. | |
| 9 | 1.13 | 1.99 | 3.39 | 1,006 | 407 | 11.61 |
| 10 | 1.41 | 1.98 | 3.40 | 961 | 297 | 11.43 |
| 11 | 1.67 | 2.01 | 3.42 | 986 | 219 | 10.78 |
| 12 | 2.03 | 2.02 | 3.41 | 943 | 278 | 10.93 |
| 13 | 2.39 | 2.04 | 3.42 | 1,023 | 184 | 10.58 |
| 14 | 1.57 | 2.14 | 3.43 | 610 | 311 | 10.41 |
| 15 | 1.47 | 2.29 | 3.42 | 615 | 302 | 10.73 |
| 16 | 1.37 | 2.46 | 3.39 | 962 | 314 | 11.55 |
| 17 | 1.58 | 2.09 | 3.35 | 1,020 | 251 | 12.06 |
| 18 | 1.58 | 2.28 | 3.35 | 1,108 | 263 | 11.93 |

In general, in producing refractories according to the method of the instant invention, most of the parameters are the same as for prior art methods used to make similar refractories. For example, the optimum overall chemistry in the batch varies with variations in firing conditions. In general, the firing of a refractory of this type is to a temperature sufficiently high that, during the firing, at least some of the auxiliary silicate phase is liquefied. Increasing the firing temperature above the minimum at which all of the auxiliary silicates are liquid will cause an increase in the total amount of liquid because of solution of other more refractory components of the complex system in the silicate liquid, and the total amount of liquid present will vary as a direct function of firing temperature, other factors being equal. Too much liquid is undesirable during firing and, as discussed above, if other factors remain constant, the total amount of liquid varies as a direct function of firing temperature, at least within certain temperature ranges. However, the total amount of liquid present at any given temperature is also a function of the overall chemistry of the refractory. Accordingly, it is important to correlate chemistry and firing temperature to achieve optimum properties in refractories of the type in question.

It will be appreciated that practicing the method of the instant invention inherently changes the lime:silica weight ratio by increasing the relative proportion of lime. Excellent results have been achieved according to the invention by controlling the silica content of the batch so that, after the calcium nitrate tempering, the overall weight ratio of lime to silica is approximately 2:1, for example, from about 1.9:1 to about 2.1:1. It is believed that such control favors formation of the highly refractory dicalcium silicate, and thereby controls the total proportion of liquid during the relatively high firing temperatures reported above so that somewhere near optimum properties are achieved. However, if a lower firing temperature is desired, it may well be advantageous to have a lower lime:silica weight ratio so that there would be adequate liquid formation at the lower firing temperature. This could readily be controlled by suitable In the foregoing examples, the use of dead burned natural magnesite is disclosed. Such a raw material is entirely suitable, but no more so than good grades of dead burned magnesites produced by calcining brucite or the like or synthetic periclase produced by calcining magnesium hydroxide slurries produced by precipitating $Mg(OH)_2$ from seawater, brines or bitterns. In fact, optimum properties can be achieved by keeping the total silica content of the refractory batch below 1 percent, e.g., as low as 0.3 percent, adding calcium nitrate to adjust the lime to silica weight ratio to from 1.9:1 to 2.1:1, and using a sufficiently high firing temperature, e.g., 3350° F. in a periodic kiln, 5 hours at temperature, at a total silica content of ½ percent.

It will be appreciated from the data presented above concerning the green densities of the unfired refractories of Examples 2 through 9 that calcium nitrate dissolved in the tempering liquid is less effective at increasing the green density when the concentration thereof is less than about 30 percent. It has been found, however, that an appreciable benefit is achieved when the tempering liquid contains as little as about 10 percent. Preferably, there should be at least about 20 percent of calcium nitrate in the tempering liquid.

In general, from about 2 parts to about 4 parts of tempering liquid should be used per 100 parts of combined magnesite and chrome ore. Preferably, from about 2.5 to about 3.5 parts of the tempering liquid should be used, on the indicated basis and, most desirably, from about 2.7 parts to about 3.4 parts.

The calcium nitrate can be dissolved in the tempering liquid, as disclosed above in the examples, or it can be incorporated as a part of the dry mix so that it is dissolved when the batch is tempered. Similarly, the magnesite, the chrome ore, or both can be moistened with a solution of calcium nitrate and then dried, so that the required solution is, again, formed upon tempering. However, the most expeditious way is to dissolve the calcium nitrate directly in the tempering liquid. Water is the preferred tempering liquid, but other solvents for calcium nitrate, e.g. alcohol or acetone, can be used.

What I claim is:

1. In a method for preparing a basic refractory which includes the steps of:
   (a) preparing a batch of from 40 to 80 parts of size graded periclase particles and from 60 to 20 parts of size graded particles of chrome ore,
   (b) mixing therewith a sufficient amount of liquid to temper said mixture,
   (c) forming said mixture into a shape, and
   (d) firing said shape,
   (e) the improvement wherein there are from 2 to 4 parts of the tempering liquid and at least 10 percent of calcium nitrate is dissolved in the tempering liquid prior to the forming of a shape from the mixture thereof with the periclase and chrome ore particles.

2. In a method as claimed in claim 1, the improvement wherein the tempering liquid contains at least 30 percent of calcium nitrate.

3. In a method as claimed in claim 1, the improvement wherein the chemistry of the batch is controlled so that the total silica content thereof is from 0.3 percent to 2 percent and the total CaO content, including that added as calcium nitrate in the tempering liquid, calculated as CaO, is from 1.5 to 2.5 times the total silica content.

4. In a method as claimed in claim 3, the improvement wherein the chemistry of the batch is controlled so that the total silica content thereof is from 1 to 2 percent.

References Cited

UNITED STATES PATENTS

| | | | |
|---|---|---|---|
| 2,656,280 | 10/1953 | Heuer | 106—59 |
| 3,285,759 | 11/1966 | Crespi | 106—61 |

JAMES E. POER, Primary Examiner